(12) United States Patent
Kulasingam et al.

(10) Patent No.: US 8,488,494 B2
(45) Date of Patent: Jul. 16, 2013

(54) RULES SYSTEM VERSIONS

(75) Inventors: Katha Kulasingam, Kanta (CA); Allen Robinson, Ottawa (CA)

(73) Assignee: Alcatel Lucent, Paris (FR)

( * ) Notice: Subject to any disclaimer, the term of this patent is extended or adjusted under 35 U.S.C. 154(b) by 160 days.

(21) Appl. No.: 13/077,102

(22) Filed: Mar. 31, 2011

(65) Prior Publication Data

US 2012/0250573 A1  Oct. 4, 2012

(51) Int. Cl.
*H04L 12/28* (2006.01)

(52) U.S. Cl.
USPC .......................................... 370/254

(58) Field of Classification Search
None
See application file for complete search history.

(56) References Cited

U.S. PATENT DOCUMENTS

| | | |
|---|---|---|
| 2011/0276530 A1* | 11/2011 | Cutler et al. .................... 706/47 |
| 2011/0307790 A1* | 12/2011 | Pandya et al. ................. 715/735 |
| 2012/0005145 A1* | 1/2012 | Cutler et al. .................... 706/47 |
| 2012/0005358 A1* | 1/2012 | Siddam et al. ................. 709/230 |
| 2012/0250573 A1* | 10/2012 | Kulasingam et al. ......... 370/254 |
| 2012/0250613 A1* | 10/2012 | Robinson et al. ............. 370/328 |

* cited by examiner

*Primary Examiner* — Robert Wilsone
(74) *Attorney, Agent, or Firm* — Kramer & Amado P.C.

(57) ABSTRACT

A rules systems version coordination method is disclosed for the initiation of a rules system version and the coordination of the rules system version with other rules system versions which may be available. Particularly, the rules system versions are coordinated so that one-and-only-one is in the Active State i.e. the state in which the Policy and Charging Rules Node (PCRN) is deriving its set of policies; rules system versions may only be promoted to the Active State from a Release State; and rules system versions may only be modified when in a Draft State, from which they may be promoted to the Release State. The rules systems version coordination method is particularly useful for providing a buffer state between rules system versions undergoing modification and the rules system version currently in service.

15 Claims, 4 Drawing Sheets

| Insufficient Subscriber Bandwidth | |
|---|---|
| Subscriber_cat=silver | Reject |
| Subscriber_cat=gold | Resize; Counter |
| Subscriber_cat=platinum | PLAT_BW |
| ... | |
| ... | |

RULES SYSTEM VERSIONS

FIELD OF THE INVENTION

The invention relates to generally to policy and charging rules function in 3GPP systems and is particularly concerned with provisioning of alternate versions of policies and rules.

BACKGROUND OF THE INVENTION

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the internet protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "long term evolution" (LTE). In an LTE network, all communications are carried over an IP channel from user equipment (UE) to an all-IP core called the evolved packet core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the policy and charging rules function (PCRF), policy and charging enforcement function (PCEF), and bearer binding and event reporting function (BBERF) of the EPC. These specifications further provide some guidance as to how these elements interact in order to provide reliable data services and charge subscribers for use thereof.

For example, 3GPP TS 29.212 and 3GPP TS 29.214 provide some guidance on the establishment of an application session by the EPC upon receipt of an application request from an application function (AF) in the form of an aa-request (AAR) message or from a packet data network gateway (PGW) in the form of a credit control request (OCR) message. The standards specify that the PCRF is responsible for receiving requests, establishing IP-CAN and gateway control sessions, creating new policy and charging control (PCC) rules commensurate with such requests, and providing these new PCC rules to the PCEF for installation. The 3GPP standards also define the format of various messages and PCC rules.

The policy and charging rules function (PCRF) must implement a set of service policies that, dependent upon the specific installation, must coordinate with network factors (device-type, access type, location, intelligence), subscriber factors (service tier, pre-paid, credit balance, entitlements), system factors (state, time of day) and application information (service description, traffic parameters). As the network evolves, the set of service policies will not remain static.

In view of the foregoing, it would be desirable to provide a flexible method to coordinate changes to the set of policies in operation at the PCRF. In particular, it would be desirable to provide a process by which a set of policies in place at an operational Policy and Charging Rules Node (PCRN) may be swapped with any of a selection of replacement policy sets.

SUMMARY OF THE INVENTION

It is an object of the invention to provide a method of rules system versions coordination.

According to an aspect of the invention there is provided a method for coordinating a plurality of rules system versions present in a Policy and Charging Rules Node, the method having the steps of: setting, by the Policy and Charging Rules Node, a first rules system version of the plurality of rules system versions in an Active State wherein the first rules systems version determines at least a subset of policies applied by the Policy and Charging Rules Node; receiving a request; applying a policy to the based on the fist rules system version; initially placing a second of the plurality of rules system versions in a Draft State; promote the second of the plurality of rules system versions from the Draft State to a Release State; promote the second rules system version of the plurality of rules system versions from the Release State to the Active State wherein the second rules system version determines at least a subset of policies applied by the Policy and Charging Rules Node; demote the first rules system version, from the Active State to the Release State; receiving a second request; and applying a policy to the second request based on the second rules system version.

In some embodiments of the invention the second rules system version has at least one modification while in the Draft State. This modification may be one of adding at least one rule, deleting at least one rule, or changing the characteristics of at least one rule.

Advantageously, the method may provide that all rules system versions of the plurality of rules system versions which are in the Draft State may only transition to the Release State.

Further, advantageously the method may provide that all rules system versions of the plurality of rules system versions which are in the Release State may transition to one of the set of states having the Draft State and the Active State. As well, the method may provide that the first rules system version is precluded from transitioning out of the Active State unless the transitioning is initiated by the transitioning of another rules system version of the plurality of rules system versions.

According to another aspect of the invention there is provided a non-transitory tangible machine-readable storage medium encoded with instructions that when executed by a Policy and Charging Rules Node (PCRN), cause the PCRN to: set a first rules system version of the plurality of rules system versions in an Active State wherein the first rules systems version determines at least a subset of policies applied by the Policy and Charging Rules Node; receive a request; apply a policy to the request based on the first rules system version; initially place a second of the plurality of rules system versions in a Draft State; promote the second of the plurality of rules system versions from the Draft State to a Release State; promote the second of the plurality of rules system versions from the Release State to the Active State wherein the second of the plurality of rules systems version determines at least a subset of policies applied by the Policy and Charging Rules Node; demote the first rules system version from the Active State to the release state; receive a second request; and apply a policy to the second request based on the second rules system version.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which.

DETAILED DESCRIPTION

Figure 1:
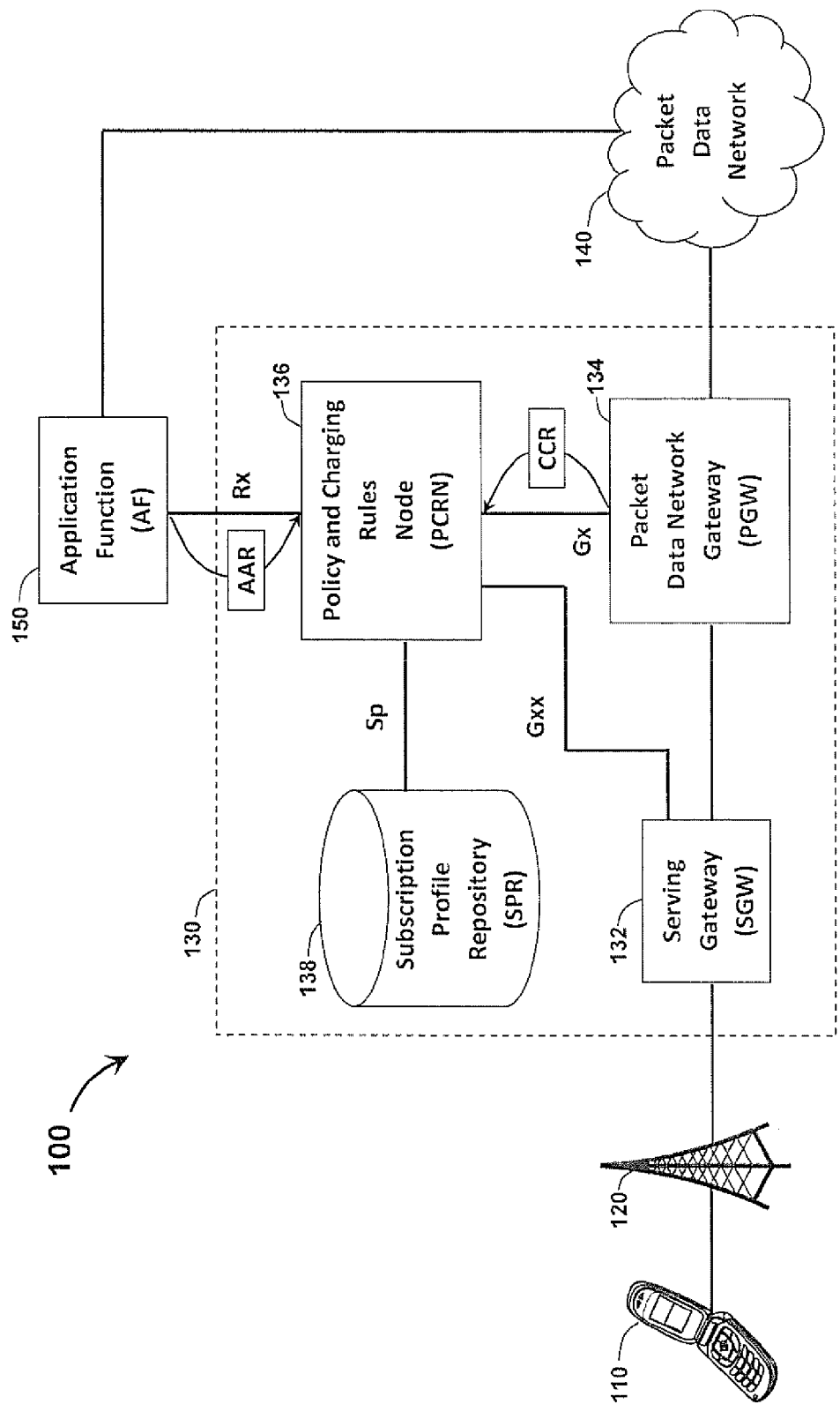
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a communications network, such as an LTE or 4G mobile communications network, for providing access to various services. The network 100 may include user equipment 110, base station 120, evolved packet core (EPC) 130, packet data network 140, and application function (AF) 150.

User equipment 110 may be a device that communicates with packet data network 140 for providing an end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or association of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130 to an end user of network 100. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the proxy mobile IP (PMIP) standard, SGW 132 may include a bearer binding and event reporting function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140 to an end user of network 100. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGVV 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. Upon receiving a request for an unknown application service from UE 110, PGW may construct a credit control request (OCR), such as, for example, CCR 170, requesting an appropriate allocation of resources and forward the request to PCRN 136.

It should be noted that while exemplary network 100 corresponds to one particular implementation of long term evolution (LTE), many variations may exist. For example, SGW 132 may not be present, PGW 134 may not be present, and/or the functions of SGW 132 and PGW 134 may be consolidated into a single device or spread across multiple additional devices.

Policy and charging rules node (PCRN) 136 may be a device that receives requests related to service data flows (SDFs) and IP-CAN sessions, generates PCC rules, and provides PCC rules to the PGW 134 and/or other PCENs (not shown). PCRN 136 may be in communication with AF 150 via an Rx interface. PCRN 136 may receive an application request in the form of an aa-request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively.

PCRN 136 may receive a request in the form of a credit control request (OCR) 170 from SGW 132 or PGW 134. As with AAR 160, upon receipt of CCR 170, PCRN may take appropriate action in response, such as, for example, generating at least one new PCC rule for fulfilling and/or responding to the CCR 170. In various embodiments, AAR 160 and CCR 170 may represent two independent requests to be processed separately, while in other embodiments, AAR 160 and CCR 170 may carry information regarding a single request, and PCRN 136 may take action based on the combination of AAR 160 and CCR 170. In various embodiments, PCRN 136 may be capable of handling both single-message and paired-message requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate quality of service (QoS) rules. Upon creating a new QoS rule or upon request by the SGW 132, PCRN 136 may provide a QoS rule to SGW 132 via the Gxx interface.

In processing various requests and other messages, PCRN 136 may make use of one or more behavioral rules, the details of which will be described below with reference to FIGS. 2-6. PCRN 136 may locate an applicable behavioral rule for a particular request, conflict, or event, and take at least one action specified by the applicable behavioral rule. In various embodiments, such a behavioral rule may include a reference to a predefined routine that the PCRN 136 may perform in response to a request or other message.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as, for example, subscriber category, bandwidth limits, charging parameters, and subscriber priority.

Packet data network 140 may be a network (e.g., the Internet or another network of communications devices) for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an aa-request (AAR) 160 defined by the Diameter protocol, to notify the PCRN 136 that resources should be allocated for the application service. This application request message may include information such as an identification of a subscriber using the application service and an identification of the particular service data flows desired to be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-6.

PCRN 136 may receive a request for establishment of a service data flow (SDF) such as, for example, AAR 160 and/or CCR 170. In attempting to establish the requested SDF, PCRN 136 may determine that there is a conflict between the request and a subscriber profile. For example, the request may specify that 512 kbps of bandwidth is requested while a subscriber record may indicate that the subscriber is only allowed to have 256 kbps of bandwidth. To resolve this conflict, PCRN 136 may locate an applicable behavioral rule that indicates that the request should be rejected. Subsequently, PCRN 136 may reject the request in accordance with the applicable rule.

Figure 2:
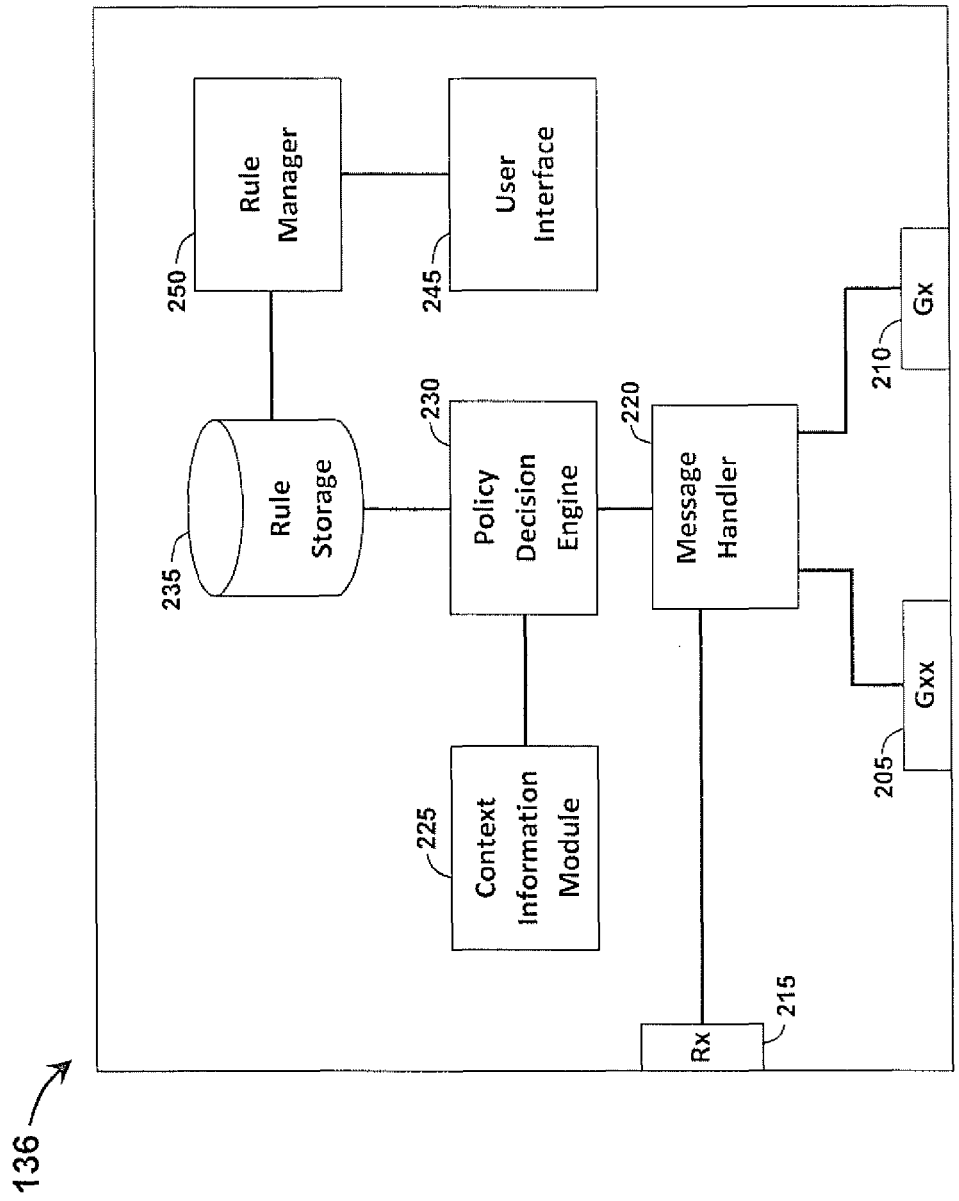
FIG. 2 illustrates an exemplary policy and charging rules node (PCRN) for providing externalized behavior.

Referring now to FIG. 2 there may be seen an exemplary policy and charging rules node (PCRN) for providing externalized behavior. PCRN 136 may include a Gxx interface 205, a Gx interface 210, an Rx interface 215, a message handler 220, a context information module 225, a policy decision engine 230, a rule storage 235, a user interface 245, and a rule manager 250.

Gxx interface 205 may be an interface having hardware and/or executable instructions encoded on a machine-readable storage medium configured to communicate with a SGW such as SGW 132. Such communication may be implemented according to the 3GPP TS 29.212. Thus, Gxx interface 205 may receive requests for QoS rules and transmit QoS rules for installation. Gxx interface 205 may further receive UE-originated application requests, session requests, and event notifications in the form of a CCR.

Gx interface 210 may be an interface having hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive UE-originated application requests, session requests, and event notifications in the form of a CCR.

Rx interface 215 may be an interface having hardware and/or executable instructions encoded on a machine-readable storage medium configured to communicate with AF 150. Such communication may be implemented according to the 3GPP TS 29.214. For example, Rx interface 215 may receive application requests, session requests, and event notifications in the form of an AAR.

Message handler 220 may include hardware and/or executable instructions on a machine-readable storage medium configured to process application and session requests received via Gxx interface 205, GX interface 210, and Rx interface 215. For example, message handler 220 may create and install new PCC rules in response to an application request. As a further example, message handler 220 may establish, modify, or terminate IP-CAN sessions and gateway control sessions in response to a session request. After fully processing a message, message handler 220 may construct and transmit a message over Gxx interface 205, GX interface 210, and/or Rx interface 215 to notify other nodes as to the result of processing the message. For example, if message handler 220 creates a new PCC rule in response to a request message, it may construct a reauthorization request (RAR) message to push the new PCC rule to an appropriate PGW.

In processing various messages, message handler 220 may request a policy decision from policy decision engine 230 and base at least part of its response to the message on the policy decision results. Message handler 220 may provide context information from the message to policy decision engine 230, either directly or via context information module 225. Policy decision results may include an indication of an action that the message handler 220 should take in response to the message, in which case message handler may perform the specified action. Alternatively or additionally, policy decision results may include an indication of a predefined routine. In such a case, message handler 220 may retrieve the predefined routine from routine storage 240 and subsequently perform the routine. As will be described in further detail with reference to FIG. 4 below, such a predefined routine may include one or more steps or actions to be taken by the message handler 220.

Context information module 225 may include hardware and/or executable instructions on a machine-readable storage medium configured to provide various context information to policy decision engine 230. For example, context information module 225 may store information carried by a received message. Context information module 225 may further store previously received and/or transmitted messages associated with a subscriber, session, and/or service data flow. Context information module 225 may further access information stored elsewhere such as, for example, subscriber information stored in an SPR such as SPR 138.

Policy decision engine 230 may include hardware and/or executable instructions on a machine-readable storage medium configured to identify rules stored in rule storage 235 that are applicable to a received message or current context. As will be described in further detail below with respect to FIG. 3, each rule may include a criteria section which indicates when a rule is applicable. Policy decision engine 230 may compare this criteria section to context information passed by message handler 220 and/or retrieved from context information module 225. Upon locating an applicable rule, policy decision engine 230 may return the results portion of the rule to message handler 220.

Rule storage 235 may be any machine-readable medium capable of storing policy decision rules for use by policy decision engine 230. Accordingly, rule storage 235 may include a machine-readable storage medium such as read-only memory (ROM), random-access memory (RAM), magnetic disk storage media, optical storage media, flash-memory devices, and/or similar storage media. In various alternative embodiments, rule storage 235 may be a device that is external to PCRN 136. As will be described in further detail below with respect to FIG. 3, rule storage 235 may store definitions of numerous policy decision rules.

User interface 245 may include hardware and/or executable instructions on a machine-readable storage medium configured to provide a user with access to PCRN 136. User interface 245 may receive input from a user and may include hardware such as, for example, a keyboard and/or mouse. User interface 245 may also display information as output to the user and may include, for example, a monitor. A user may access rule manager 250 and/or routine manager 255 via user interface 245.

Rule manager 250 may include hardware and/or executable instructions on a machine-readable storage medium configured to define, modify, and otherwise manage policy decision rules. For example, rule manager 250 may receive a definition of a new policy decision rule via user interface 245, format the definition according to a standard policy decision rule syntax used by PCRN 136, and store the definition in rule storage 235. Rule manager 250 may further provide a definition of an existing policy decision rule to a user upon request via user interface 245. Rule manager 250 may subsequently receive a modified rule definition, format the definition if necessary, and store the definition in rule storage 235. In storing a modified definition, rule manager 250 may overwrite an existing definition or store the modified definition as a new version of the policy decision rule while preserving the old definition. Thus, rule manager 250 may provide version control functionality.

Figures 3, 4:
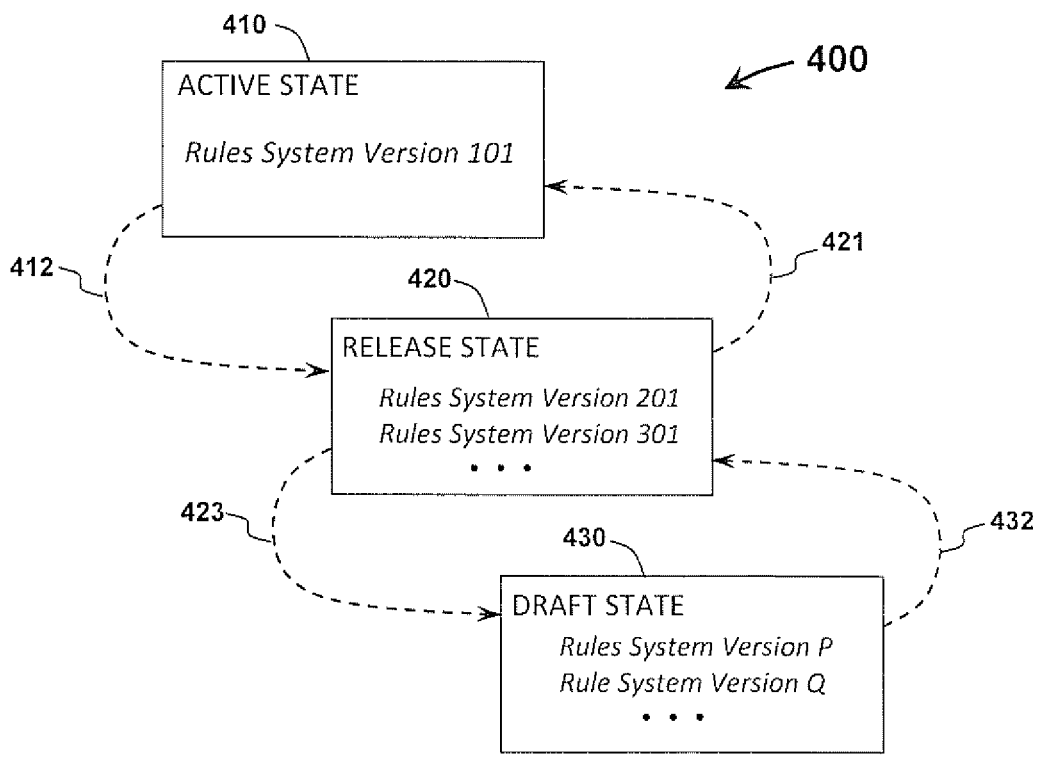
FIG. 3 illustrates an exemplary data arrangement for storing policy decision rules in an embodiment in accord with FIG. 2.
FIG. 4 illustrates an exemplary state diagram depicting rule system versions occupying specific operational states.

Referring now to FIG. 3 there may be seen an exemplary data arrangement 300 for storing policy decision rules. Data arrangement 300 may be, for example, a table in a database stored in rule storage 235 of FIG. 2, SPR 138 of FIG. 1, or another node (not shown) within EPC 130 of FIG. 1. Alternatively, data arrangement 300 could be a series of linked lists, an array, or a similar data structure. Thus, it should be apparent that data arrangement 300 is an higher level depiction of the underlying data; any data structure suitable for storage of the underlying data may be used.

Data arrangement 300 may include various rule sets for use in policy decisions related to various types of messages and in other contexts. Rule sets may be defined based on various context aspects. For example, each rule set may be defined to apply to certain received messages such as an IP-CAN modification request or service data flow request. Additionally or alternatively, rules sets may be defined to apply to particular conflicts or events that may prompt the request for a policy decision function such as, for example, the loss of a bearer, a request for more resources than are available, or a request for more resources than are allowed for a particular subscriber.

In the example of data arrangement 300, rule set 310 may include rules applicable when a subscriber has requested more bandwidth than the subscriber is allowed. It should be noted that rule set 310 is a simplification in some respects. For example, rule set 310 may be applicable to requests for one or more of the following: aggregate maximum bandwidth, maximum bandwidth, and guaranteed bandwidth. Data arrangement 300 may include additional rule sets 320.

Rule set 310 may include a number of rules 312, 314, 316, 318. Each rule may include a criteria section for use in determining whether the rule is applicable and a result section for indicating an action to be taken if the rule is applicable. As an example, rule 312 indicates that it is applicable when the subscriber category is 'silver.' It should be noted that the exemplary criteria section is in some respects a simplification and that various implementations may use additional and/or alternative conditions for application of a rule. Rule 312 further indicates that, when applicable, the PCRN 136 should reject the message being processed.

A result section may indicate more than one action to be taken by a PCRN such as PCRN 136. As an example, rule 314 may indicate that it is applicable when the subscriber category is 'gold.' When applicable, rule 314 indicates that the request should be first resized such that it would not create a conflict. Rule 314 further indicates that the resized request should be returned to the requesting node as a counteroffer. Thereafter, the requesting node may submit an additional request in accordance with the counter offer which the PCRN 136 may process as a new request.

In various embodiments, a rule may indicate a predefined routine that the PCRN 136 should follow in responding to the message. Thus, rule 316 indicates that it is applicable when the subscriber category is 'platinum,' and that the PCRN should perform a routine having the name PLAT_BW in responding to the current message Rule set 310 may include additional rules 318.

The sum total of a given set of policy rules may be considered a rules system. Different rules systems may be distinguished by a process of version management, wherein each rules system may be given a version name and versions are placed into operation in a strict manner to preclude disruption of PCRF functioning.

Referring to FIG. 4 there may be seen a state diagram 400 having an active state 410, a release state 420, and a draft state 430. These states comprise the possible states in which a specific rules system version may reside and limit the interactions possible with the rules system versions.

In operation, active state 410 contains the single rules system version which is controlling the PCRN. That is, only one rules system version comprises the set of policy rules providing the Policy and Charging Rules Function. In FIG. 4, Rules System Version 101 is in the active state 410.

In order to be placed into active state 410, a given rules system version must be promoted from the release state 420. When a given rules system version is promoted, the rules system version currently in the active state 410 is demoted and placed in the release state 420. There may be a plurality of rules system versions available in the release state 420 as shown by the exemplary versions "Rules Systems Version 201, Rules Systems Version 301, . . . ", Each or any of these rules systems version may be promoted to the active state 410 as shown by state transition path 421. In the event a rules system version in the release state 420 is promoted to the active state 410, the rules system version currently in the active state 410 is demoted to the release state 420 as shown by state transition path 412.

Likewise, in order to be placed into release state 420, a given rules system version must be promoted from the draft state 430. There may be a plurality of rules system versions available in the draft state 430 as shown by the exemplary versions "Rules Systems Version P, Rules Systems Version Q, . . . ", Each or any of these rules systems version may be promoted to the release state 420 as shown by state transition path 432. As there may exist a plurality of rules system versions in the release state 420, a promotion of a rules systems version from the draft state 430 does not necessitate a demotion of any rules systems versions from release state 420. Instead, demotion of a rules systems version from the release state 420 to draft state 430, as depicted by transition path 423, is effected only upon specific command.

The three states: active 410, release 420, and draft 430, interoperate in a manner which allows modification of rules systems versions while reducing the risk of accidental introduction of defective or erroneous rules systems into live policy control.

In operation, only those rules system versions which are in the draft state 430 are susceptible to changes in their makeup. Such changes may include rule addition, rule deletion, or rule modification. When a given set of modifications to a rules system version is complete, the rules system version may be promoted to release state 420 where it is configured and made ready for use. According to an embodiment of the invention, rules system versions in the release state 420 are susceptible to no rules modification. In certain embodiments it may be advantageous to change certain descriptive labels referring to the rules system version, for example to indicate a particular property of the rules set in the rules system, but such descriptive label modification does not modify the operational behaviour of the rules system embodied by the version.

Further describing the operation, as previously mentioned, only those rules system versions in the release state 420 may be promoted to active state 410 and thereby assume control of the Policy and Charging Rules Function. When such a promotion is effected, the rules system version which had heretofore been in active state 410 is automatically demoted to release state 420. An important aspect attendant to this operation is that the just demoted rules system version is in a position to be re-promoted back into the active state 410 and resume control of the Policy and Charging Rules Function should any operational problems arise due to the promotion of the other rules system version.

Referring now to TABLE 1, there may be seen a depiction of the acceptable state changes.

TABLE 1

| Rule System Version | Transition to Active State | Transition to Release State | Transition to Draft State |
|---|---|---|---|
| is in Draft State | disallowed | ✓ | not applicable |
| is in Release State | ✓ | not applicable | ✓ |
| is in Active State | not applicable | ✓ | disallowed |

Figure 5:
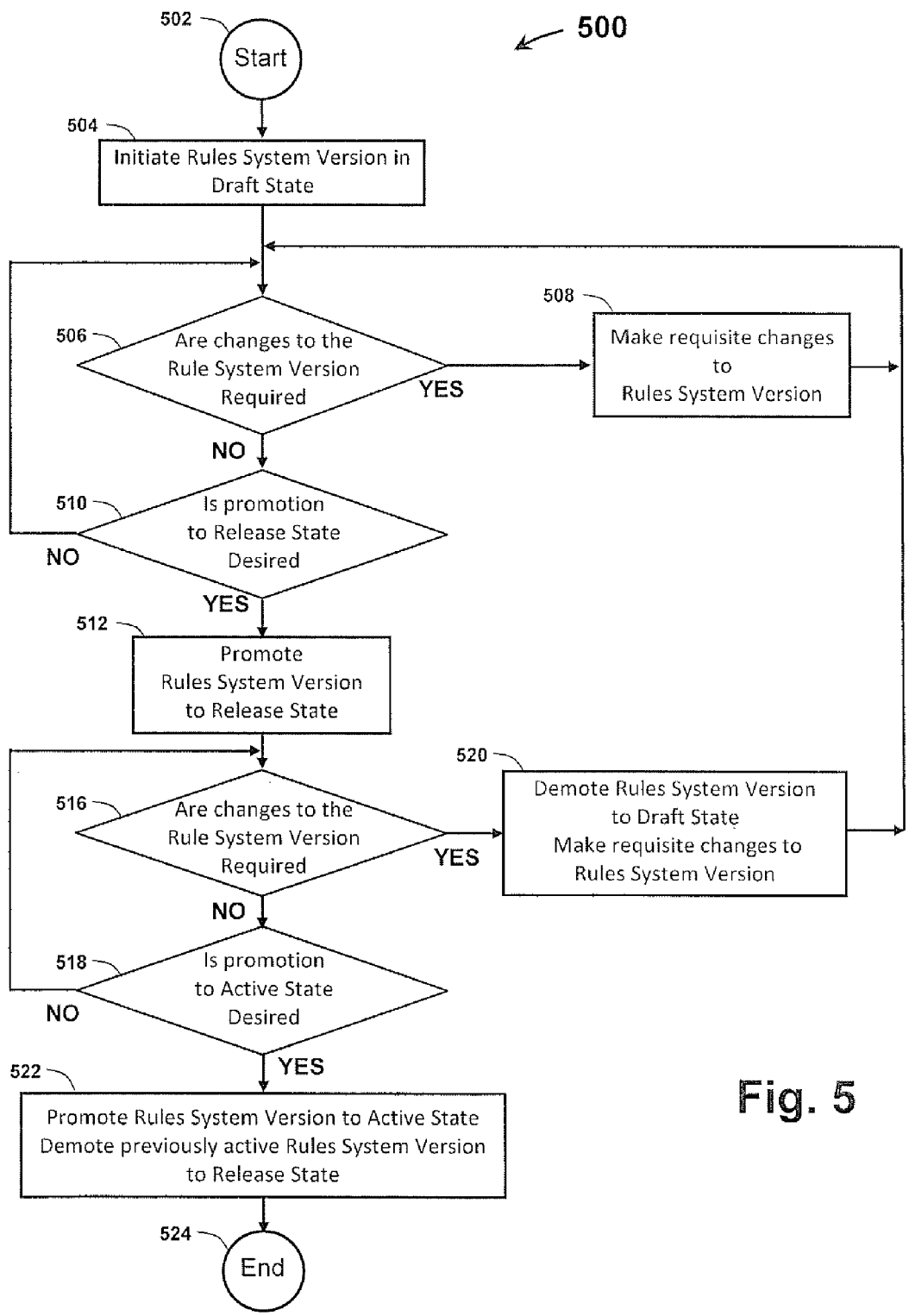
FIG. 5 illustrates an exemplary method for transitioning rule system versions between the operational states of the embodiment shown in FIG. 4.

Referring now to FIG. 5, there may be seen an exemplary method for initiating a rules system version and placing it into service in accordance with an embodiment of the invention. Method 500 may be performed by the components of PCRN 136 and/or PCRN 136 such as, for example, message handler 220.

Method 500 may begin at step 502 and proceed to step 504 wherein a rules system version is initiated in the Draft State. Method 500 may then proceed to step 506 where PCRN 136 may determine whether changes to the rules system version are required. In the event that changes are required, as the rules system version is in the Draft State, control proceeds to step 508 wherein the requisite changes to the rules system version is made. Control may then proceed back to step 506.

In the event that no changes are required, Method 500 may then proceed to step 510 where PCRN 136 may determine whether promotion to the Release State is desired. If promotion is not desired, the rules system version remains in the Draft State and control may then return to step 506. In the event that promotion is desired, control proceeds to step 512 wherein the rules system version is promoted to Release State.

Method 500 may then proceed to step 516 where PCRN 136 may determine whether changes to the rules system version are required. In the event that PCRN 136 determines that changes are required, control may proceed to step 520 wherein the rules system version is demoted to Draft State, the requisite changes are made, and control returns to step 506.

In the event that PCRN 136 determines that no changes to the rules system version are required, control may proceed to step 518 wherein PCRN 136 may determine whether promotion to the Active State is desired. In the event that PCRN 136 determines that promotion to the Active State is not desired, control may return to step 516.

In the event that PCRN 136 determines that promotion of the rules system version to Active State is desired, control may proceed to step 522 wherein the rules system version is promoted to Active State; the rules system version which was previously in the Active State is demoted to Release State; and control proceeds to step 524 wherein the method ends.

It is to be understood that this method may be applied to a plurality of rules system versions wherein concurrently some may be in the Draft State, some may be in the Release State, and one will be in the Active State.

According to the foregoing, various exemplary embodiments provide for the initiation of a rules system version and the coordination of the rules system version with other rules system versions which may be available. Particularly, the rules system versions are coordinated so that one-and-only-one is in the Active State i.e. the state in which the Policy and Charging Rules Node (PCRN) is deriving its set of policies; rules system versions may only be promoted to the Active State from the Release State; and rules system versions may only be modified when in the Draft State, from which they may be promoted to the Release State.

It is to be understood that various changes in the details, materials, and arrangements of the parts which have been described and illustrated in order to explain the nature of this invention may be made by those skilled in the art without departing from the scope of the invention as expressed in the following claims.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Note, in the preceding discussion a person of skill in the art would readily recognize that steps of various above-described methods can be performed by specialized programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover specialized computers programmed to perform said steps of the above-described methods.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. A method for coordinating a plurality of rules system versions present in a Policy and Charging Rules Node, said method comprising:
    setting, by the Policy and Charging Rules Node, a first rules system version of said plurality of rules system versions in an Active State wherein said first rules systems version determines at least a subset of policies applied by the Policy and Charging Rules Node;
    receiving a request;
    applying a policy to the request based on the first rules system version;
    initially placing a second of said plurality of rules system versions in a Draft State;
    promoting said second of said plurality of rules system versions from said Draft State to a Release State;
    promoting said second rules system version of said plurality of rules system versions from said Release State to the Active State wherein said second rules systems version determines at least a subset of policies applied by the Policy and Charging Rules Node;
    demoting said first rules system version from the Active State to the Release State;
    receiving a second request; and
    applying a policy to the second request based on the second rules system version.

2. A method as claimed in claim 1 wherein said second rules system version has at least one modification while in the Draft State.

3. A method as claimed in claim 2 wherein said at least one modification comprises adding at least one rule.

4. A method as claimed in claim 2 wherein said at least one modification comprises deleting at least one rule.

5. A method as claimed in claim 2 wherein said at least one modification comprises changing the characteristics of at least one rule.

6. A method as claimed in claim 1 wherein all rules system versions of said plurality of rules system versions which are in the Draft State may only transition to the Release State.

7. A method as claimed in claim 1 wherein all rules system versions of said plurality of rules system versions which are in the Release State may transition to one of the set of states having the Draft State and the Active State.

8. A method as claimed in claim 1 wherein said first rules system version is precluded from transitioning out of the Active State unless said transitioning is initiated by the transitioning of another rules system version of said plurality of rules system versions.

9. The method of claim 1, wherein the step of demoting is in response to the step of promoting said second rules system version of said plurality of rules system versions from said Release State to the Active State.

10. The method of claim 1, wherein the step of applying a policy comprises transmitting a policy decision to a policy and charging enforcement node.

11. A non-transitory tangible machine-readable storage medium encoded with instructions that when executed by a Policy and Charging Rules Node (PCRN) cause the PCRN to:
    set a first rules system version of said plurality of rules system versions in an Active State wherein said first rules systems version determines at least a subset of policies applied by the Policy and Charging Rules Node;
    receive a request;
    apply a policy to the request based on the first rules system version;
    initially place a second of said plurality of rules system versions in a Draft State;
    promote said second of said plurality of rules system versions from said Draft State to a Release State;
    promote said second of said plurality of rules system versions from said Release State to the Active State wherein said second of said plurality of rules systems version determines at least a subset of policies applied by the Policy and Charging Rules Node;
    demote said first rules system version from the Active State to the release state;
    receive a second request; and apply a policy to the second request based on the second rules system version.

12. The non-transitory tangible machine-readable storage medium of claim 11 further having instructions wherein all rules system versions of said plurality of rules system versions which are in the Draft State may only transition to the Release State.

13. The non-transitory tangible machine-readable storage medium of claim 11 further having instructions wherein all rules system versions of said plurality of rules system versions which are in the Release State may transition to one of the set of states having the Draft State and the Active State.

14. The non-transitory tangible machine-readable storage medium of claim 11 further having instructions wherein all rules system versions of said plurality of rules system versions which are in the Release State may only transition to one of the set having the Draft State and the Active State.

15. The non-transitory tangible machine-readable storage medium of claim 11 further having instructions wherein said first rules system version is precluded from transitioning out of the Active State unless said transitioning is initiated by the transitioning of another rules system version of said plurality of rules system versions.

\* \* \* \* \*